US005922288A

United States Patent [19]

Herst

[11] Patent Number: 5,922,288

[45] Date of Patent: Jul. 13, 1999

[54] DEVICE FOR ISOLATING A COMPONENT OF A PHYSIOLOGICAL SAMPLE

[76] Inventor: C. V. Taylor Herst, 5735 Clover Dr., Oakland, Calif. 94618

[21] Appl. No.: 08/865,022

[22] Filed: May 29, 1997

Related U.S. Application Data

[51] Int. Cl.[6] .............................. G01N 35/10; G01N 1/38

[52] U.S. Cl. .............................. 422/101; 422/63; 422/72; 422/100; 422/102; 436/45; 436/174; 436/177; 436/178; 436/180; 435/4; 435/6

[58] Field of Search ................................. 422/63, 64, 67, 422/68.1, 72, 73, 100, 101, 102; 436/43, 45, 164, 165, 174, 177, 180; 435/4, 6

[56] References Cited

U.S. PATENT DOCUMENTS

| | | | |
|---|---|---|---|
| 4,314,968 | 2/1982 | Guigan | 422/64 |
| 4,390,499 | 6/1983 | Curtis et al. | 422/72 |
| 4,863,582 | 9/1989 | Wijangco et al. . | |
| 5,188,963 | 2/1993 | Stapleton . | |
| 5,217,593 | 6/1993 | MacConnell . | |
| 5,229,297 | 7/1993 | Schnipelsky . | |
| 5,242,803 | 9/1993 | Burtis et al. | 435/7.92 |
| 5,270,212 | 12/1993 | Horiuchi et al. | 436/45 |
| 5,330,916 | 7/1994 | Williams et al. . | |
| 5,334,499 | 8/1994 | Burdick et al. . | |
| 5,346,999 | 9/1994 | Cathcart . | |
| 5,364,838 | 11/1994 | Rubsamen et al. . | |
| 5,693,233 | 12/1997 | Schembri | 210/787 |
| 5,723,050 | 3/1998 | Unger et al. | 210/772 |

OTHER PUBLICATIONS

Mischiati, Carlo et al., (1993) "Use of an Automated Laboratory Workstation for Isolation of Genomic DNA Suitable for PCR and Allele–Specific Hybridization," *Bio Techniques* 15 : 146–151.

Mischiati, Carlo et al, (1994) "A Chromatographic procedure for fully automated isolation of DNA from human whole blood," *J. Biochem. Biophys.* 28 : 185–193.

Fisher, J.A. et al., (1991) "Plasmid purification by phenol extraction from guanidinium thiocyanate solution: Development of an automated protocol," *Analytical Biochemistry* 194(2): 309–315.

Kapperud, G. et al., (1993) "Detection of pathogenic Yersinia enterocolitica in foods and water by immunomagnetic seperation, nested polymerase chain reactions, and colorimetric detection of amplified DNA," *Applied and Environmental Microbiology* 59(9):2938–2944.

(List continued on next page.)

Bret Field

*Primary Examiner*—Long V. Le
*Attorney, Agent, or Firm*—Bozicevic, Field & Francis LLP;

[57] ABSTRACT

Devices and methods are provided for the isolation of one or more components of a sample. The self contained device of the subject invention includes a reaction chamber, at least one reagent chamber containing a sealed, predetermined amount of reagent, at least one waste chamber, an entry port and a mechanism for moving the reaction chamber sequentially into fluid communication with each of these other components. Also provided are methods of using the subject devices to perform procedures in which an initial sample is sequentially subjected to one or more reagent addition and washing steps. The subject devices and methodology are particularly suited to the isolation of nucleic acids from physiological samples.

16 Claims, 2 Drawing Sheets

OTHER PUBLICATIONS

Ramirez–Solis, R. et al.(1991) "Genomic DNA micoextraction: a method to screen numerous samples," *Analytical Biochemistry,* 201(2): 331–335.

Taylor, Scheryle, et al., (1990) "Comparative Study of Automated Versus Manual Extraction of DNA from Clinical Specimens," *AM.J.Clin.Path.* 93(6):179–753.

Merel, Patrick et al., (1996) "Completely Automated Extraction of DNA from Whole Blood," *Clinical Chemistry* 8:1285–1286.

Boom, R., et al. (1990) "Rapid and Simple Method for Purification of Nucleic Acids," *Journal of Clinical Microbiology* 28: No. 3; 495–503.

Cheung, Ramsey C., et al. (1994) "Rapid and Sensitive Method for Detection of Hepatitis C Virus RNA by Using Silica Particles," *Journal of Clinical Microbiology,* 32: No.10; 2593–2594.

Casas, I., et al. (1994) "New Method for the extraction of viral RNA and DNA from cerebrospinal fluid for the use in the polymerase chain reaction assay" *Journal of Virological Methods,* 53:25–36.

Muir, Peter et al., (1997) "Rapid Diagnosis of Enterovirus Infection by Magnetic Bead Extraction an Polymerase Chain Reaction Detection of Entervirus RNA in Clinical Specimens," *Journal of Clinical Microbiology* 13: No. 1; 31–38.

Deggerdal, Arne. et al., (1997) "Rapid Isolation of PCR–Ready DNA from Blood, Bone Marrow and Cultured Cells, BAsed on Parameagnetic Beads," *BioTechniques* 22:554–557.

Chomczynski, Piotr. et al., (1997) "DNAzol$^{R}$: A Reagent for the Rapid Isolation of Genomic DNA," *BioTechniques* 22:550–553.

Wahlberg, Johan et al., (1992) "Automated magnetic preparation of DNA templates for solid phase sequencing," *Electophoresis,* 13:547–551.

70
50
60

60
71

80
72
60

60
73

60
74

60
75

60
76

60
77

78
60

79
60

DEVICE FOR ISOLATING A COMPONENT OF A PHYSIOLOGICAL SAMPLE

INTRODUCTION

1. Technical Field

The field of this invention is sample preparation.

2. Background of the Invention

There are many situations where one wishes to isolate one or more components of a liquid sample. For example, with testing of biological samples for the presence of a particular analyte, e.g. in clinical diagnostic testing, the initial biological sample, such as blood, is often subjected to one or more processes designed to separate and/or enrich a particular fraction of the initial sample from the remaining components of the sample. For example, depending on the assay to be performed one may be interested in separating a certain cellular population or component thereof, such as cellular organelles, polynucleic acids, proteins and the like, from the remaining components of the sample.

With polynucleic acids such as DNA and RNA, there are many techniques currently available for the isolation of these components from biological samples such as blood. Generally, these techniques include disruption of cells with a detergent solution, followed by extraction of nucleic acids with organic solvents. Other methods use temperature extremes (boiling or freeze-thawing the biological sample) in order to extract the nucleic acids. These procedures are generally performed manually, with reagents taken repeatedly from a single, common source.

Current procedures for the isolation of polynucleic acids suffer from two important disadvantages. First, the technician is potentially exposed to biohazardous materials from the formation of aerosols and/or droplets resulting from repeated opening and closing of the specimen container and from waste material formed from the extraction process. Second, taking repeated aliquots from a single source of a reagent can result in contamination. Cross-contamination also occurs when the technician's gloves become contaminated from repeated opening and closing of the specimen tube. When PCR is used to amplify purified DNA, cross-contamination is clearly unacceptable.

Accordingly, there is a need for the continued development of devices which provide for the simple isolation of a one or more components of a sample. In particular, there is a need for the development of devices for use in the isolation of polynucleic acids which minimize the risk of exposure of the user to reagents and/or sample and do not suffer from the problems of cross contamination inherent in devices and methodologies which use reagents from a single source.

Relevant Literature

U.S. Patents describing DNA isolation devices include: U.S. Pat. Nos. 4,863,582; 5,188,963; 5,217,593; 5,229,297; 5,330,916; 5,334,499 and 5,346,999. Maniatis et al., Molecular Cloning: A Laboratory Manual (1988)(Cold Spring Harbor Press), 9.14–9.23 and the references cited therein provide a review of techniques for isolating high-molecular weight DNA from mammalian cells. Maniatis et al., supra, pp 7.84–7.85 and the referneces cited therein describe techniques for isolating RNA from human tissues. Other references of interest include: Taylor et al., A. J. C. P. (1990)93:749–753; Wahlberg et al., Electrophoresis (1992) 13:547–551; Mischiati et al., Biotechniques (1993) 15:146–151; Mischiati et al., J. Biochem. Biophys. Methods (1994) 28:185–193; Fisher et al., Anal. Biochem. (1991) 194:309–315; Kepperud et al., Applied & Environmental Microbiology (1993) 59:2938–44; Ramirez-Solis et al., Anal. Biochem. (1992) 201:331–335; Taylor et al., Am. J. Clin. Path. (1990) 93:749–753; Merel et al., Clin. Chem. (1996) 42:1285–1286; Boom et al., J. Clin. Microbiology (1990) 28:495–503; Cheung et al., J. Clin. Microbiology (1994) 32:2593–2597; Casas et al., J. Virological Methods (1995) 53:25–36; Muir et al., J. Clin. Microbiology (1993) 31:31–38; Chomczynski et al., BioTechniques (1997) 22:550–553; and Deggerdal & Larsen, Biotechniques (1997) 22:554–557.

SUMMARY OF THE INVENTION

A self-contained device for use in the isolation of a component of a sample, as well as methods for its use, are provided. The self-contained device has a reaction chamber, at least one port for moving material between the reaction chamber and the environment external to the device, at least one reagent chamber comprising a premeasured amount of reagent, at least one waste chamber, and a means for moving said reaction chamber into fluid communication with each of the port, reagent and waste chambers. The device finds use in the isolation of components of a variety of different samples such as biological fluids, and is particularly suited for the isolation of polynucleic acids from biological samples such as blood.

DESCRIPTION OF THE SPECIFIC EMBODIMENTS

Figure 1:
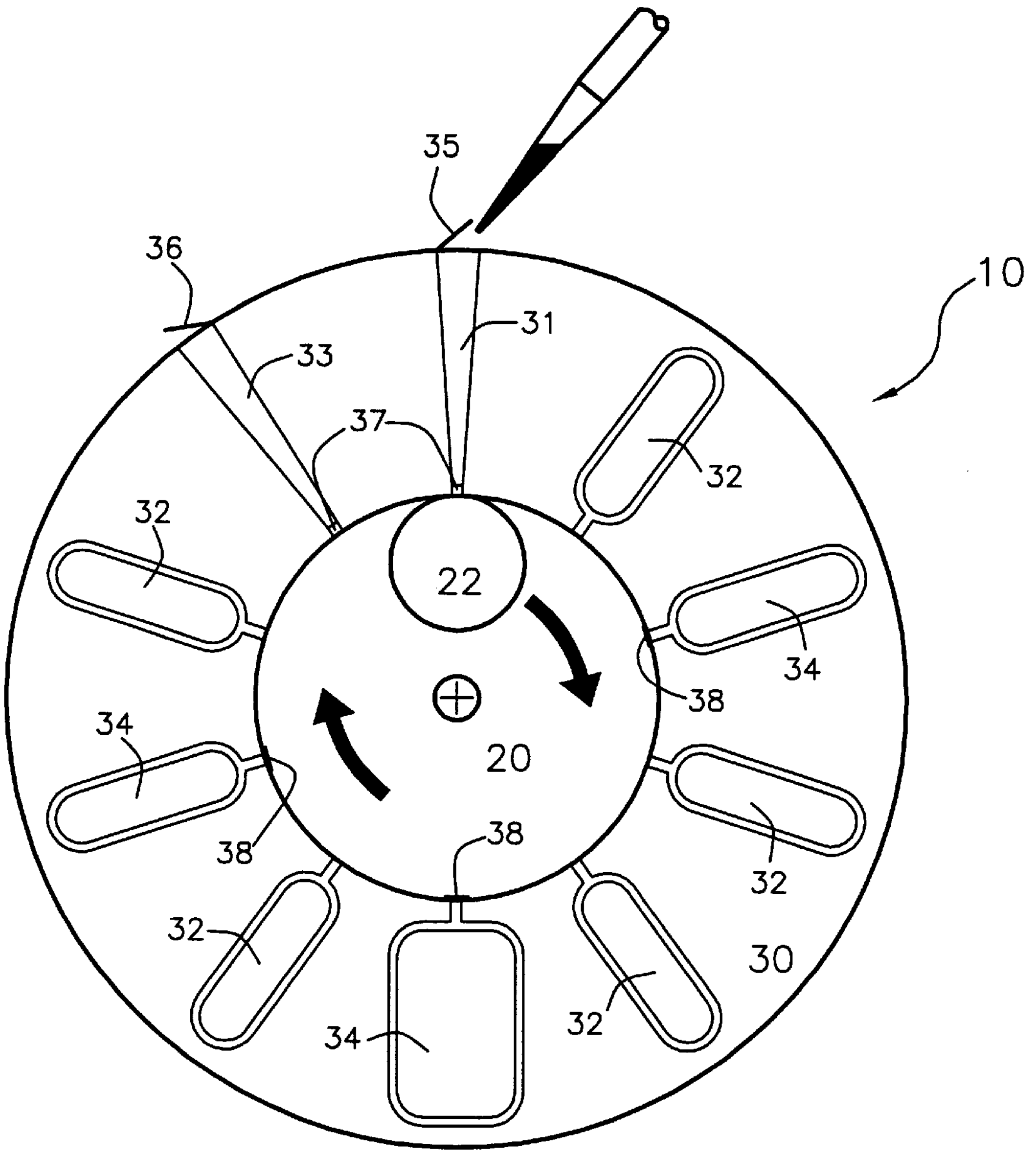
FIG. 1 provides a one-dimensional overhead view of a "wheel-within-a-wheel" embodiment of the device according to the subject invention.

Self-contained devices for isolation of a component of a sample are provided. The subject devices comprise a reaction chamber, a port for moving material between the reaction chamber and the external environment of the device, at least one reagent container, at least one waste container and movement means for moving the reaction chamber into fluid communication with the port, reagent and waster containers. In further describing the subject invention, first the device will be described in greater detail followed by a description of methods of using the device to isolate sample components.

Before the subject invention is further described, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

It must be noted that as used in this specification and the appended claims, the singular forms "a," "an" and "the" include plural reference unless the context clearly dictates otherwise. Unless defined otherwise all technical and scientific terms used herein have the same meaning as commonly understood to one of ordinary skill in the art to which this invention belongs.

A critical feature of the subject device is that it is self-contained, such that all of the various components of the device are present in a single, integral configuration. The device may be in a variety of shapes, where the particular shape will, for the most part, depend on convenience, such as the ability to work with other devices. Accordingly, the devices may be in the form of a disk or wheel, rectangular, cylindrical and the like. The dimensions of the device will primarily be chosen with respect to the intended use of the device, but will generally range from about 0.5 to 5.0 in., usually from about 0.5 to 4.0 in. in height, from about 0.5 to 5.0 in., usually from about 1.0 to 5.0 in. in length, and from about 0.5 to 2.0 in., usually from about 0.5 to 1.0 in. in width. A particularly preferred embodiment of the subject invention is a "wheel-within-a-wheel" configuration, where this configuration is described in greater detail below in terms of the figures.

The subject devices comprise a single reaction chamber which is the location for contact between the various reagents and sample or components thereof. The reaction chamber will have a volume sufficient to house the sample and reagents, where the volume of the reaction chamber will typically range from about 0.2 to 2.0 ml, usually from about 0.5 to 2.0 ml and more usually from about 1.0 to 2.0 ml. The actual shape of the reaction chamber will be selected primarily as a matter of convenience, but will typically be circular, square, rectangular, cylindrical and the like.

In addition to the reaction chamber, the device will comprise at least one, and usually a plurality of, reagent chambers comprising a volume of reagent, where the number of reagent chambers in the device will generally range from about 1 to 8, usually from about 2 to 6, more usually from about 4 to 6. The amount of reagent present in the reagent chambers may or may not be premeasured, depending on whether the particular method for which the device is to be used permits the use of an excess of reagent or a particular amount of reagent at each processing step. The reagent chambers will provide a sealed environment for the reagent housed therein, whereby the reagent is kept free from contaminant, pollutants and the like. Where convenient and/or necessary to preserve the properties of the reagent housed in the reagent chamber, the reagent chamber may also shield the contents thereof from electromagnetic radiation. The volume of the reagent chambers will typically range from about 0.1 to 2.0 ml, usually from about 0.2 to 1.0 ml and more usually from about 0.5 to 1.0 ml As with the reaction chamber, the shape of the reagent chamber will primarily be chosen as a matter of convenience, and may be selected from oval, circular, square, rectangular, and the like, where when a plurality of reagent chambers are provided, the reagent chambers may be the same shape or have different shapes. The reagent chambers will generally comprise a removable barrier means which serves to retain the reagent in the reagent chamber, but can be removed to allow passage of the reagent into the reaction chamber at the appropriate time, where representative removable barrier means include burstable or frangible seals, sealed vials of glass or plastic, porous or semi-porous membranes, and the like.

In addition to the reagent and reaction chambers, the device will also comprise at least one waste chamber for receiving waste reagent, sample components and the like following contact of the sample with the various reagents during the method being performed. The device may have one common waste chamber, into which all of the waste following each sample/reagent contacting step is introduced, or a plurality of separate waste chambers for receiving waste following each sample/reagent contacting step. The volume of the waste chamber may range greatly depending on whether it is to serve as the common, single waste chamber or one of several waste chambers, where the volume will generally range from about 0.2 to 5.0 ml, usually from about 1.0 to 4.0 ml and more usually from about 2.0 to 4.0 ml.

The device will further comprise at least one passageway for moving sample between the reaction chamber and the environment external to the device. The passageway will generally be a channel having a tube-like configuration which may or may not be sealable, as may be convenient to the particular embodiment of the device. Where the device comprises just one passageway, the passageway will serve as an entry port for introducing sample into the reaction chamber and an exit port for retrieving the contents of the reaction chamber following use of the device in the particular method being performed. Preferably, the device will comprise separate entry and exit ports.

Critical to the subject invention will be a movement means for moving the reaction chamber into fluid communication with each of the above listed components of the device, i.e. the various reagent chambers, waste chamber(s), passageways and the like. The exact nature of the movable means will necessarily depend on the particular device configuration, where the movement means will generally be such as to provide for the reaction chamber and the other device components to be moved in opposite directions relative to one another. For example, in the preferred "wheel-within-a-wheel" configuration, described in greater detail below in terms of the figures, the movement means will allow for movement of at least the inner wheel such that the entry way into the reaction chamber can be brought into fluid communication with each of the device components of the outer wheel. In such a configuration, the movement means will at least provide for movement of the inner wheel while the outer wheel is maintained in a stationary position. Alternatively, both wheels may be movable in different directions. The movement means may provide for movement of the wheel in a single direction or in a forward and reverse direction, where the latter embodiment is necessary when the device comprises a single waste chamber. In certain embodiments of the device, the waste chamber may have been evacuated of substantially all contents so that the pressure in the sealed waste chamber is substantially lower than the pressure outside of the waste chamber. When the seal is broken, for example upon movement of the reaction chamber into fluid communication with the waste chamber, the pressure differential between the reaction chamber and the waste chamber provides for bulk fluid movement from the reaction chamber to the waste chamber.

Critical to the subject device is the presence of a component retaining means which provides for retention of certain components of the originally introduced sample in the reaction chamber following each sample/reagent contact step. Exemplary retention means include selective membranes that allow for the passage of waste from the reaction chamber into the waste chamber while retention of the sample component or derivative thereof of interest in the reaction chamber. Depending on the nature of the sample component or derivative thereof to be retained, representative membranes include glass fiber filters (including borosilicate glass with or without resin binders), polyvinylidene fluoride membranes (both hydrophilic and hydrophobic), and the like, where the particular membrane means employed will necessarily depend on the nature of the material to be selectively retained in the reaction chamber.

The subject device having now been generally described, the preferred "wheel-within-a-wheel" embodiment of the subject invention will now be further described with respect to FIG. 1. Device 10 comprises outer wheel 30 and inner wheel 20, where outer wheel 30 is held stationary and inner wheel 20 is able to move relative to outer wheel 30 in the direction indicated by the arrows. Inner wheel 20 comprises reaction chamber 22. Outer wheel 30 comprises entry port 31, which is sealable by door 35 and separated from reaction chamber 22 by septum 37. Outer wheel 30 further comprises a plurality of reagent chambers 32 and waste chambers 34, where the waste chambers have a selective membrane 38 positioned at their entry which provides for selective passage of waste from the reaction chamber to the waste chamber upon movement of the reaction chamber into fluid communication with the waste chamber. Outer wheel 30 further comprises exit port 33 which can be sealed by door 36 and septum 37.

The device may be fabricated from any convenient materials. Disposable devices will be preferred for most component isolation methods. Therefore, the device will usually be fabricated from materials which are sufficiently inexpensive and easy to work with such that the final device is sufficiently inexpensive to be disposable. Suitable materials include polypropylene and copolymers thereof, polymethylpentene, teflon and copolymers thereof, and the like.

The device having now been described both generally and in terms of a figure depicting the preferred wheel-within-a-wheel configuration, representative methods of the types of procedures that may be performed with the device will now be described. Generally, the subject device finds use in a methodology in which it is desired to sequentially contact a sample with one or more different reagents and then separate a first component of the reaction mixture from the remaining components of the reaction mixture. Because the reagents of the device are present in separate, sealed containers prior to contact with the sample or derivative thereof in the reaction chamber, the subject device finds particular use in methods where it is desired to reduce or substantially eliminate the possibility of cross-contamination, which arises when common sources of reagent are employed.

The device may be employed in methods of isolating a cell or component thereof from a physiological sample. The physiological sample may be a fluid or solid, where the solid may or may not be treated to render it fluid, e.g. through homogenization in the presence of a liquid phase. Representative samples include blood, serum, urine, plasma, sputum, as well as cell and tissue homogenates, from animal, plant and microbial sources. The sample from which the cell or cellular component thereof is to be isolated with the device may be pretreated as is desired and/or convenient, where pretreatment may include removal of particulate matter, viscous material, insoluble material, attached support, and the like.

In practicing the subject method, the sample will first be introduced into the reaction chamber via the passageway, e.g. entry port. Any convenient means for introducing the sample may be employed, where such means include pipette, syringe, automated delivery syringe, and the like. If the passage comprises a door, following introduction of the sample into the reaction chamber through the passageway, the door may be closed.

Following introduction of the sample into the reaction chamber, the reaction chamber component of the device will be moved into fluid communication with a reagent chamber. The manner in which the reaction chamber is moved into fluid communication with the reagent chamber will necessarily depend on the particular device configuration. For example, with the "wheel-within-a-wheel" configuration, the reaction chamber will be moved into fluid communication with the reagent chamber by moving the inner wheel relative to the outer wheel for a sufficient distance to bring the entrance of the reaction chamber into alignment with the exit port of the reagent chamber. The alignment of the exit port with the entrance of the reaction chamber will remove any barriers to fluid flow of reagent into the reaction chamber, e.g. a removable barrier will be removed upon alignment. Consequently, reagent fluid will flow into the first reaction chamber. Fluid flow may be enhance by applying pressure to the reagent chamber, e.g. by compressing the chamber, or other convenient means.

Following introduction of the reagent from the first reagent chamber into the reaction chamber, the reagent and the sample will be allowed to incubate and react as intended depending on the particular methodology being performed. If necessary, agitation may be applied to the contents of the reaction chamber as desired, e.g. to enhance the rate of reaction, using any convenient means, such as rocking the device, vibrating the device, repetitive back-and-forth agitation, and the like.

After the reaction chamber and first reagent have had a sufficient amount of time to react, the reaction chamber will then be moved into fluid communication with the waste chamber in a manner such that the port to the reaction chamber is in alignment with the port to the waste chamber. As above, movement of the reaction chamber into alignment with the waste chamber will be accomplished in a manner dependent on the nature of the device, e.g. by moving the inner wheel relative to the outer wheel. Moving the ports of the reaction and waste chamber into alignment results in movement of a portion of the contents of the reaction chamber into the waste chamber, where the portion of the reaction chamber components that moves into the waste chamber comprises substantially none of the to be isolated cells or components thereof of the initial physiological sample. Movement of the portion of the reaction chamber contents can be effected using any convenient means, such as by spinning the device causing bulk fluid flow in response to centrifugal force, as a result of a pressure differential between the reaction chamber and the waste chamber, and the like. The portion of the reaction chamber contents that flows into the waste chamber must pass through a means of retaining the remainder of the reaction chamber contents in the reaction chamber, such as a selective membrane, permeable or semi-permeable filter, screen, mesh and the like.

The above steps of moving the reaction chamber into fluid communication with the reagent and waste chambers are reiterated as many times as desired, where the precise number of times will necessarily depend on the specific nature of the method being performed, e.g. the number of different reagents the sample must be contacted with and the number of different waste removal steps. The sequence of contacting with reagent and waste chambers may be adjusted to accommodate the particular method being performed, such as moving the reaction chamber sequentially into fluid communication with two or more reagent chambers prior to moving the reagent chamber into contact with the waste chamber.

Following the final reagent addition and/or waste removal step, the resultant isolated cells or components thereof may then be removed from the reaction chamber, where the isolated components may or may not be present on a removable solid support, where such support may have been introduced during one or more of the reagent addition steps. Removal of the isolated components of the reaction chamber may be accomplished using any convenient means, such as suction, pipetting and the like, through the passageway provided in the device, where the passageway may be the same as or different from the passageway used to introduce the sample into the reaction chamber, where the passageway will preferably be different from the first or entry passageway.

One preferred embodiment of the subject method is the use of the subject method to isolate nucleic acids from a sample. Nucleic acids that may be isolated according to the subject invention include DNA, RNA, and the like, where the nucleic acids will usually be naturally occurring nucleic acids found in physiological samples. However, the nucleic acids may also be synthetic nucleic acids in a non-physiological fluid sample, e.g. oligonucleotide primers, gene vectors encapsulated in viruses or liposomes, and the like.

For isolation of naturally occurring nucleic acids from blood, a representative physiological sample, according to the subject invention, the blood sample will first be introduced into the reaction chamber. The volume of the blood sample will generally range from about 1.0 μl to 5.0 ml, usually from about 10 to 200 μl and more usually from about 100 to 200 μl. The reaction chamber will then be moved into fluid communication with a first reagent chamber which comprises a red blood cell lysing reagent, where representative reagents include ammonium chloride, hypertonic detergent solutions (including, but not limited to, 0.32 M sucrose plus one percent Triton X-100), and the like. Alignment of the reaction chamber and the reagent chamber results in movement of the lysing reagent into the reaction chamber. Following introduction of the lysing reagent into the reaction chamber, mild agitation is applied to the reaction chamber contents through gentle rocking of the device. The reaction chamber is then moved into fluid communication with a first waste chamber. Upon alignment of the reaction and waste chambers, the waste components present in the reaction chamber move into the waste chamber, while the nucleic acid comprising portion of the initial sample is retained in the reaction chamber by the membrane or other selective passage means positioned at the entrance to the waste chamber. The reaction chamber is then moved into fluid communication with a reagent chamber comprising a protein denaturant. Representative protein denaturants include guanidinium isothiocyanate, guanadinium hydrochloride and the like. Following introduction of the protein denaturant, the contents of the reaction chamber are again mildly agitated. Next, the reaction chamber is moved into fluid communication with a reagent chamber comprising a nucleic acid precipitating agent, e.g. an organic solvent, usually a lower alcohol, such as isopropyl alcohol, ethanol, and the like. Following introducing of the precipitating agent, the contents of the reaction chamber are again agitated and the resultant fluid is then moved into a second waste chamber following movement of the reaction chamber into fluid communication with the second waste chamber. The precipitated nucleic acids may then be washed by moving the reaction chamber into fluid communication with a reagent chamber comprising a wash reagent, such as isopropyl alcohol, isopropyl alcohol/water mixture (70/30) and the like, followed by removal of the fluid waste from the reaction chamber by moving the reaction chamber into fluid communication with a waste chamber. Finally, the reaction chamber is moved into fluid communication with a reagent chamber comprising a resuspension buffer, where representative resuspension buffers include Tris/EDTA, nuclease-free water, and the like, and the resuspended nucleic acids are removed from the reaction chamber upon movement of the reaction chamber into fluid communication with the exit passageway.

In another embodiment of the subject invention, the device is employed in a method to isolate cellular proteins from a physiological sample such as blood. In this particular embodiment of the subject method, the first step is to introduce a blood sample into the reaction chamber, as described above. The reaction chamber is then brought into alignment with the first reagent chamber which comprises a red blood cell lysing agent, which agent enters the reaction chamber and lyses the red blood cells. The reaction chamber is then moved into fluid communication with the waste chamber and the lysate is selectively removed from the reaction chamber, as described above. The reaction chamber is then moved into fluid communication with a second reagent chamber that comprises a white blood cell cytoplasmic membrane lysing reagent, e.g. a detergent such as Igepal CA-630, a non-ionic detergent, which lyses the white blood cell cytoplasmic membranes. The reaction chamber is then moved into fluid communication with a waste chamber (either a second waste chamber or the same waste chamber as the first waste chamber, depending on the particular device configuration) and the lysate is removed into the waste chamber. The reaction chamber is then moved into fluid communication with a third reagent chamber that comprises a white blood cell lysing reagent, e.g. a detergent such as sodium dodecyl sulfate (SDS), preferably comprising a protease inhibitor to protect the proteins, whereby the lysing reagent enters the reaction chamber.

Alternatively, after the addition of a white blood cell cytoplasmic membrane lysing reagent, as described above, the cytoplasmic proteins may be collected by moving the reaction chamber into communication with a collection chamber, preferably containing a protease inhibitor to protect the proteins. The cytoplasmic lysate is moved into the collection chamber by simple centrifugation. The remaining white cell nuclei may then be processed as describe above.

Instead of isolating cellular components, the device can also be used in methods of isolating whole cells from a physiological sample. For example, to isolate white blood cells from whole blood, one could perform the above methodology, where the only modification would be to not perform the final step of introducing a white blood cell lysing reagent into the reaction chamber.

In another embodiment of the subject invention, the device is employed to isolate bacterial nucleic acids from particular viscous clinical specimens, such as sputum. In this particular embodiment of the subject method, the first step is to introduce a sputum sample into the reaction chamber as described above. The reaction chamber is then brought into alignment with the first reagent chamber which comprises a reagent to help liquefy the sputum, e.g. dithiothreitol, beta-mercaptoethanol, and the like. Mild agitation is applied to the reaction chamber contents.

The reaction chamber is then moved into fluid communication with the waste chamber and the lysate is selectively removed from the reaction chamber as described above. The reaction chamber is then brought into alignment with a second reagent chamber which comprises a reagent to digest the bacterial cell wall (reagents include Proteinase K in combination with SDS). Mild agitation is applied to the reaction chamber contents. The reaction chamber is then brought into alignment with a third reagent chamber comprising a protein denaturant. Following introduction of the protein denaturant, the contents of the reaction chamber are again mildly agitated. Next, the reaction chamber is moved into fluid communication with a reagent chamber comprising a nucleic acid precipitating agent, e.g. an organic solvent, usually a lower alcohol, such as isopropyl alcohol, ethanol, and the like. Following introducing of the precipitating agent, the contents of the reaction chamber are again agitated and the resultant fluid is then moved into a second waste chamber following movement of the reaction chamber into fluid communication with the second waste chamber. The precipitated nucleic acids may then be washed by moving the reaction chamber into fluid communication with a reagent chamber comprising a wash reagent, such as isopropyl alcohol, isopropyl alcohol/water mixture (70/30) and the like, followed by removal of the fluid waste from the reaction chamber by moving the reaction chamber into fluid communication with a waste chamber. Finally, the reaction chamber is moved into fluid communication with a reagent chamber comprising a resuspension buffer, where representative resuspension buffers include Tris/EDTA, nuclease-free water, and the like, and the resuspended nucleic acids are removed from the reaction chamber upon movement of the reaction chamber into fluid communication with the exit passageway.

Although each of the steps described above can be performed manually depending on the configuration of the particular device being employed, conveniently, one or more of the method steps may be automated and computer controlled, such as the movement steps, the reagent introduction and waste removal steps and the like, and devices specifically designed to be used in automated processes are included within the scope of the present invention.

The following examples are offered by way of illustration and not by way of limitation.

EXPERIMENTAL

1. Isolation of DNA from Whole Blood

The following describes the isolation of DNA from whole blood using the "wheel-within-a-wheel" configuration of the subject device and is described with reference to FIGS. 2A to 2J (where the device is shown in cross-section).

Figures 2A, 2B, 2C, 2D, 2E, 2F, 2G, 2H, 2I, 2J:
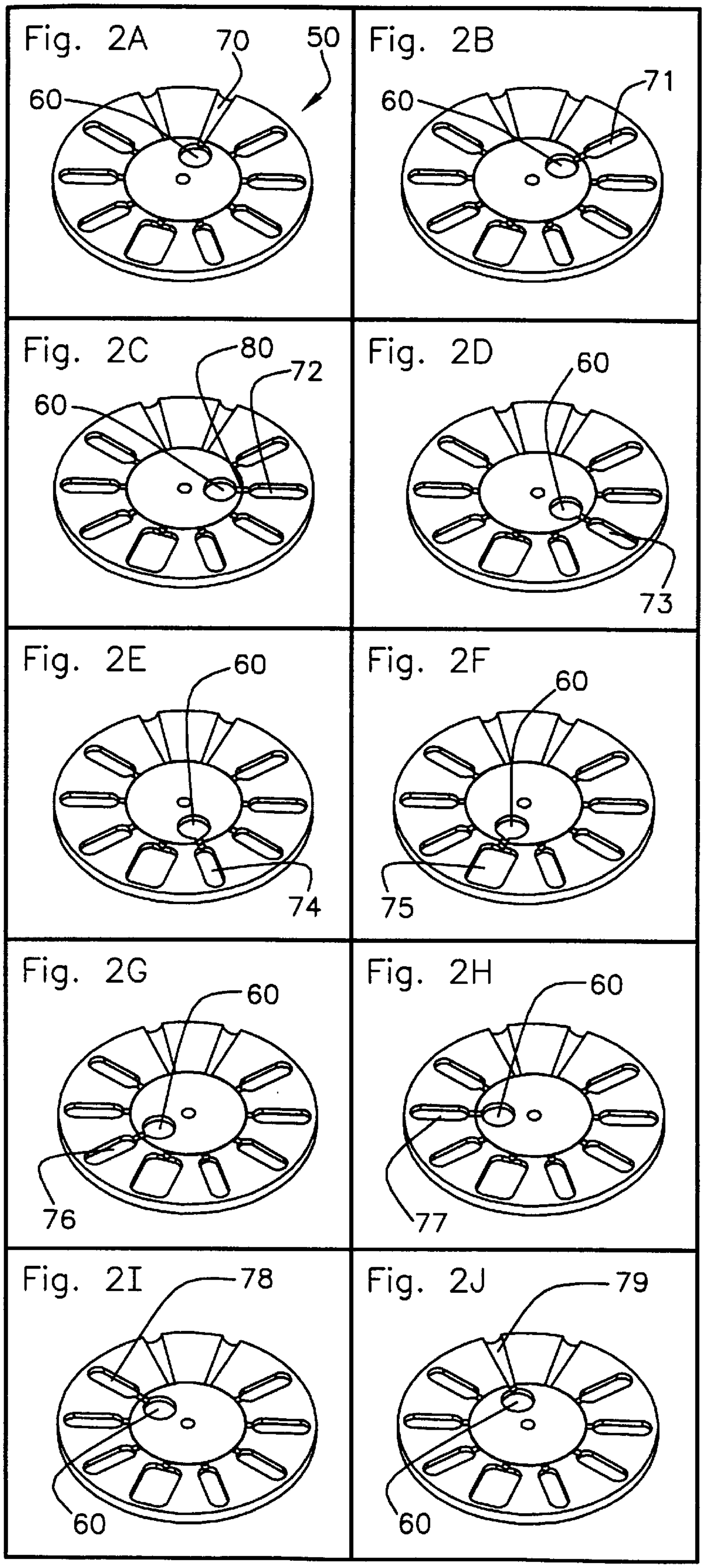
FIGS. 2A to 2J provide a cross sectional representation of the device at various stages in a method according to the subject invention.

0.1 ml of whole blood is introduced into reaction chamber 60 through entry port 70 of device 50 as shown in FIG. 2A. Next, reaction chamber 60 is rotated into fluid communication with first reagent chamber 71 which comprises 0.2 ml of a red blood cell lysing solution containing 0.32 M sucrose, 0.01 M Tris buffer pH 7.5, 0.005 M magnesium chloride, and 1.0 percent (v/v) Triton X-100, as shown in FIG. 2B. The lysing solution is forced into the reaction chamber by compressing reagent chamber 71. The contents of the reaction chamber are then subjected to mild agitation for 60 sec by rocking the device back and forth along its central axis. Reaction chamber 60 is then moved into fluid communication with the first waste chamber 72, and the device is spun to force the lysate through membrane 80 into the waste chamber while retaining the DNA comprising non-lysate component of the initial sample in reaction chamber 60, as shown in FIG. 2C. The reaction chamber is then moved into fluid communication with a second reagent chamber 73 that contains 0.2 ml of a protein denaturing solution comprising guanidinium isothiocyante and a detergent mixture which is moved into the reaction chamber by compressing the reagent chamber, as shown in FIG. 2D. Following agitation of the reaction chamber contents by mild rocking of the device for 30 min., the reaction chamber is moved into fluid communication with a third reagent chamber 74 comprising 0.2 ml of isopropyl alcohol, as shown in FIG. 2E. Reagent chamber 74 is compressed to move the isopropyl alcohol into reagent chamber 60, resulting in precipitation of the DNA in the reaction chamber. The reaction chamber is then moved into fluid communication with waste chamber 75 as shown in FIG. 2F, and the device is spun in a manner such that the supernatant present in the reaction chamber moves into the waste chamber 75 while the precipitated DNA remains in reaction chamber 60. Reaction chamber 60 is then moved into fluid communication with reagent chamber 76 that comprises 0.5 ml of isopropyl alcohol to wash the precipitated DNA, as shown in FIG. 2G. Reaction chamber 60 is then moved into fluid communication with waste chamber 77, as shown in FIG. 2H, and the device is spun to remove the waste from reaction chamber 60 into waste chamber 77 while retaining the washed, precipitated DNA in reaction chamber 60. Reaction chamber 60 is then moved into fluid communication with final reagent chamber 78, as shown in FIG. 2I, which comprises 0.1 ml of a resuspension buffer comprising 10 mM Tris buffer pH 8.0 plus 1.0 mM EDTA, which buffer is forced into the reaction chamber by compressing reagent chamber 78. Finally, the reaction chamber 60 is moved into fluid communication with port 79, as shown in FIG. 2J, and the resuspended, isolated DNA is removed from reaction chamber 60 by pipette, not shown.

It is evident from the above results and discussion that improved devices and methodology are provided for the isolation of cells or components thereof from samples, particularly physiological samples. The subject invention provides for a number of distinct advantages, including: (a) the substantial elimination of the possibility of cross-contamination which often occurs when common reagent sources are employed; (b) the standardization of procedures and elimination of lab variability; and (c) a reduction in human exposure to reagent and waste products which may be hazardous, and the like. Such advantages are particularly relevant to the nucleic acid isolation procedures.

All publications and patent applications cited in this specification are herein incorporated by reference as if each individual publication or patent application were specifically and individually indicated to be incorporated by reference. The citation of any publication is for its disclosure prior to the filing date and should not be construed as an admission that the present invention is not entitled to antedate such publication by virtue of prior invention.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

What is claimed is:

1. A self-contained device for contacting a sample or portion thereof with one or more premeasured amounts of a reagent, said device comprising:

(a) a reaction chamber;

(b) a port for introducing said sample into said reaction chamber;

(c) at least one reagent chamber comprising a premeasured amount of a reagent, where the volume of the reagent chamber does not exceed the volume of the reaction chamber;

(d) at least one waste chamber; and (e) movement means for positioning said reaction chamber sequentially in fluid communication with said port, said at least one reagent chamber and said at least one waste chamber.

2. The device according to claim 1, wherein said device further comprises a retaining means for retaining a selected portion of said sample in said reaction chamber while allowing a non-selected portion of said sample to move into said at least one waste chamber.

3. The device according to claim 1, wherein said port is an entry port for introducing sample into said reaction chamber, and said device further comprises an exit port for removing treated sample from said reaction chamber.

4. The device according to claim 1, where in said movement means provides for said reaction chamber to move in the opposite direction relative to said port, said at least one reagent chamber and said at least one waste chamber.

5. A self-contained device for isolating a predetermined component of a sample, said device comprising:

(a) a reaction chamber;

(b) an entry port for introducing liquid sample into said reaction chamber;

(c) a plurality of reagent chambers, wherein each reagent chamber comprises a premeasured amount of reagent and the volume of each of said reagent chambers does not exceed the volume of said reaction chamber;

(d) at least one waste chamber;

(e) retaining means for selectively retaining said predetermined component in said reaction chamber while allowing other sample components to move into said waste chamber;

(f) an exit port for removing said predetermined component from said reaction chamber; and (g) movement means for positioning said reaction chamber sequentially in fluid communication with said entry port, said plurality of reagent chambers, said at least one waste chamber and said exit port.

6. The device according to claim 5, wherein said movement means provides for moving said reaction chamber in an opposite direction relative to said entry port, plurality of reagent chambers, at least one waste chamber and exit port.

7. The device according to claim 5, wherein said device comprises a plurality of waste chambers.

8. The device according to claim 5, wherein said device comprises an inner wheel and an outer wheel, wherein said reaction chamber is positioned on said inner wheel and said entry port, plurality of reagent chambers, at least one waste chamber and exit port are positioned on said outer wheel.

9. The device according to claim 5, wherein said device comprises a plurality of reagents for extracting polynucleic acids from a sample.

10. A self contained device for extracting a component from a liquid sample, said device comprising:

(a) a reaction chamber;

(b) an entry port for introducing said liquid sample into said reaction chamber;

(c) a plurality of reagent chambers, wherein each reagent chamber comprises a premeasured amount of reagent, where the volume of each of said reagent chambers does not exceed the volume of said reaction chamber;

(d) at least one waste chamber;

(e) retaining means for selectively retaining said component in said reaction chamber while allowing other sample components to move into said waste chamber;

(f) an exit port for removing said retained component from said reaction chamber; and (g) movement means for positioning said reaction chamber sequentially in fluid communication with said entry port, said plurality of reagent chambers, said at least one waste chamber and said exit port.

11. The device according to claim 10, wherein said device comprises an inner wheel and an outer wheel capable of moving in opposite directions relative to one another, wherein said reaction chamber is positioned on said inner wheel and said entry port, plurality of reagent chambers, at least one waste chamber and exit port are positioned on said outer wheel.

12. The device according to claim 11, wherein said device comprises:

(a) a first reagent chamber comprising a premeasured amount of a red cell lysing buffer;

(b) a second reagent chamber comprising a premeasured amount of a protein denaturant;

(c) a third reagent chamber comprising a premeasured amount of a polynucleic acid precipitating reagent;

(d) a fourth reagent chamber comprising a premeasured amount of a washing solution; and (e) a fifth reagent chamber comprising a premeasured amount of a rehydration solution.

13. A self-contained device for contacting a sample or portion thereof with one or more premeasured amounts of a reagent, said device comprising:

(a) a reaction chamber having a volume ranging from about 0.2 to 2.0 ml;

(b) a port for introducing said sample into said reaction chamber;

(c) at least one reagent chamber having a volume ranging from about 0.1 to 2.0 ml and comprising a premeasured amount of a reagent;

(d) at least one waste chamber; and (e) movement means for positioning said reaction chamber sequentially in fluid communication with said port, said at least one reagent chamber and said at least one waste chamber.

14. The device according to claim 13, wherein said device further comprises a retaining means for retaining a selected portion of said sample in said reaction chamber while allowing a non-selected portion of said sample to move into said at least one waste chamber.

15. The device according to claim 13, wherein said port is an entry port for introducing sample into said reaction chamber, and said device further comprises an exit port for removing treated sample from said reaction chamber.

16. The device according to claim 1, wherein said movement means provides for said reaction chamber to move in the opposite direction relative to said port, said at least one reagent chamber and said at least one waste chamber.

* * * * *